(12) United States Patent
Deneault et al.

(10) Patent No.: US 8,572,938 B2
(45) Date of Patent: Nov. 5, 2013

(54) HEADER HEIGHT CONTROL WITH CLOSED CENTER PUMP

(75) Inventors: Dustin D. Deneault, LeClaire, IA (US); Aaron S. Ritter, Milan, IL (US)

(73) Assignee: Deere & Company, Moline, IL (US)

( * ) Notice: Subject to any disclaimer, the term of this patent is extended or adjusted under 35 U.S.C. 154(b) by 97 days.

(21) Appl. No.: 13/099,864

(22) Filed: May 3, 2011

(65) Prior Publication Data

US 2012/0279187 A1 Nov. 8, 2012

(51) Int. Cl.
*A01D 41/14* (2006.01)

(52) U.S. Cl.
USPC ............... 56/10.2 E; 56/208; 60/451; 60/469

(58) Field of Classification Search
USPC .......... 56/10.2 E, 11.9, 14.9, 15.1, 15.2, 15.8, 56/15.9, 17.1, DIG. 10, DIG. 11, 208; 91/6, 91/18, 451, 469; 61/451, 469
See application file for complete search history.

(56) References Cited

U.S. PATENT DOCUMENTS

| | | | | |
|---|---|---|---|---|
| 3,597,907 A * | 8/1971 | Neal | ............... | 56/208 |
| 3,623,304 A * | 11/1971 | Molzahn | ........... | 56/208 |
| 4,401,009 A * | 8/1983 | Zeuner et al. | ........ | 91/28 |
| 4,622,803 A * | 11/1986 | Lech | ............. | 56/10.2 E |
| 5,237,802 A | 8/1993 | Fachini et al. | | |
| 7,191,582 B2 * | 3/2007 | Bomleny | ......... | 56/10.2 E |
| 2010/0162885 A1 * | 7/2010 | Hughes et al. | ...... | 91/361 |

FOREIGN PATENT DOCUMENTS

WO 2008006730 A1 1/2008

OTHER PUBLICATIONS

EP Search Report dated Jul. 5, 2012 (5 pages).

* cited by examiner

*Primary Examiner* — Alicia Torres

(57) ABSTRACT

An agricultural combine has a header height control circuit supplied with hydraulic fluid from a closed center pump. The pump has a variable displacement. The pump displacement is controlled by a control line connected to the pump. The control line is supplied with fluid from the feederhouse lift cylinders that passes through a valve. The valve supplies hydraulic fluid at the feederhouse lift cylinders to the control line of the pump. Upon receiving fluid from the valve the closed center pump rapidly changes its outlet pressure to match the pressure in the feederhouse lift cylinders and thus reduces the response time of the closed center pump.

8 Claims, 3 Drawing Sheets

HEADER HEIGHT CONTROL WITH CLOSED CENTER PUMP

FIELD OF THE INVENTION

The present invention relates to agricultural combine harvesting machinery, and more particularly to hydraulic circuits for feederhouse height control.

BACKGROUND OF THE INVENTION

Agricultural combines are large self-propelled vehicles used for harvesting, threshing separating and cleaning agricultural grain crops in the field as they are being harvested. A harvesting head is typically disposed across the front of the combine vehicle and is supported on a feederhouse. This harvesting head is configured to cut and convey the crop into the combine vehicle itself where it is threshed, separated, and cleaned.

The feederhouses are raised and lowered by hydraulic cylinders that are coupled between the feederhouses and the combine vehicle itself. As the hydraulic cylinders are extended, the feederhouse pivots upward with respect to the combine vehicle and the harvesting head mounted on the feederhouse is raised higher above the ground. As the hydraulic cylinders are retracted, the feederhouse pivots downward with respect to the combine vehicle and the harvesting head mounted on the feederhouse is lowered closer to the ground.

The feederhouse is constantly raised and lowered as the feederhouse travels through the field in order to maintain the feederhouse at a constant height. With increased combine speed through the agricultural field and the greater weight and size of modern harvesting heads, it has been difficult to provide hydraulic circuits to drive the feederhouse cylinders that can respond quickly to changes in the contours of the ground. Closed center hydraulic circuits have been disfavored because they are slow to respond. Open center hydraulic circuits have been increasingly favored.

Unfortunately, however, open center hydraulic circuits require more energy to operate due to their continuous flow of hydraulic fluid under pressure even when the hydraulic cylinders are not being filled or emptied. This equates to increased fuel consumption, increased load on the combine engine and increased pollution.

What is needed is a hydraulic circuit for raising and lowering harvesting heads that has lower power demands, fuel consumption and responds faster to command signals. It is an object of this invention to provide such a hydraulic circuit.

SUMMARY OF THE INVENTION

In accordance with a first aspect of the invention, an agricultural combine is provided, the agricultural combine including a combine vehicle on which a harvesting head is mounted, the harvesting head supported on a feederhouse pivotally coupled to the front of the combine vehicle, the harvesting head supported by a plurality of hydraulic cylinders coupled to and between the feederhouse and a chassis of the combine vehicle to support the harvesting head, the cylinders being coupled to a hydraulic circuit further comprising a closed center hydraulic pump, the pump having a variable displacement, wherein the displacement is controllable by application of hydraulic fluid to a control line of the pump, the pump defining an input port coupled to a hydraulic reservoir to receive hydraulic fluid therefrom, the pump further defining an output port, the hydraulic circuit further comprising a hydraulic lift valve fluidly coupled to the outlet port of the pump to receive hydraulic fluid therefrom, the hydraulic lift valve being further coupled to the cylinders to supply hydraulic fluid thereto from the pump, wherein the hydraulic circuit further comprises an electrically responsive pressure control valve having a first or outlet port coupled to the control line of the pump to signal the pump to generate a pressure substantially equal to the hydraulic pressure in the cylinders at least when the hydraulic lift valve is closed, wherein the pressure control valve is selectively coupleable to the cylinders for maintaining a commanded hydraulic pressure in the cylinders over a range of cylinder positions.

The agricultural combine may further include an electronic control unit electrically coupled to the pressure control valve to signal the valve to apply the commanded pressure to the cylinders. The agricultural combine may further include a pressure sensor responsive to a pressure in the cylinders, wherein the pressure sensor is coupled to the electronic control unit to provide a signal generated by the pressure sensor to the electronic control unit, wherein the signal corresponds to the pressure in the cylinders. The hydraulic circuit may further include a flow control valve in the form of a solenoid-operated on/off valve to couple the outlet port of the pressure control valve to a port of the cylinders to establish a cylinder float mode. The pressure control valve may regulate cylinder pressure in the cylinders in the cylinder float mode. The pressure control valve includes a sump or third port coupled to a reservoir to conduct hydraulic fluid from the cylinder to the reservoir and the pressure control valve includes an input or second port is coupled to the pump to conduct hydraulic fluid from the pump to the cylinders. The hydraulic circuit may further include a regulator valve, and the regulator valve disposed in the control line between the displacement controller of the pump and the reservoir to continually bleed down the control line.

In accordance with a second aspect of the invention, an agricultural combine comprises a combine vehicle, and a feederhouse pivotally coupled to the front of the combine vehicle, wherein said feederhouse is configured to support a harvesting head, wherein said feederhouse is supported by a plurality of hydraulic cylinders coupled to and between the feederhouse and a chassis of the combine vehicle, wherein said cylinders are coupled to a hydraulic circuit further comprising a closed center hydraulic pump, said pump having a variable displacement, wherein said displacement is controllable by application of hydraulic fluid to a control line of said pump, said pump defining an input port coupled to a hydraulic reservoir to receive hydraulic fluid therefrom, said pump further defining an output port, said hydraulic circuit further comprising a hydraulic lift valve fluidly coupled to the outlet port of said pump to receive hydraulic fluid therefrom, said hydraulic lift valve being further coupled to the cylinders to supply hydraulic fluid thereto from said pump, wherein said hydraulic circuit further comprises a valve means coupled to said control line of said pump to signal said pump to generate a pressure substantially equal to the hydraulic pressure in the cylinders at least when the hydraulic lift valve is closed, wherein said valve means is selectively coupleable to said cylinders for maintaining a commanded hydraulic pressure in said cylinders over a range of cylinder positions.

In accordance with a third aspect of the invention, a hydraulic circuit for controlling the height of a harvesting head and feederhouse mounted on a combine vehicle supported by a plurality of hydraulic cylinders coupled to and between the feederhouse and a chassis of the combine vehicle wherein said hydraulic cylinders are disposed to raise the harvesting head and feederhouse when extended and to lower the harvesting head and feederhouse when retracted, said hydraulic circuit comprising a closed center hydraulic pump, said pump having a variable displacement, wherein said displacement is controllable by application of hydraulic fluid to a control line of said pump, said pump defining an input port coupled to a hydraulic reservoir to receive hydraulic fluid therefrom, said pump further defining an output port, said hydraulic circuit further comprising a hydraulic lift valve fluidly coupled to the outlet port of said pump to receive hydraulic fluid therefrom, said hydraulic lift valve being further coupled to the cylinders to supply hydraulic fluid thereto from said pump, wherein said hydraulic circuit further comprises a valve means coupled to said control line of said pump to signal said pump to generate a pressure substantially equal to the hydraulic pressure in the cylinders at least when the hydraulic lift valve is closed, wherein said valve means is selectively coupleable to said cylinders for maintaining a commanded hydraulic pressure in said cylinders over a range of cylinder positions

DESCRIPTION OF THE PREFERRED EMBODIMENT

The terms "front", "in front of", "forward", "fore-and-aft", "rear", "behind", "rearward", and the like as used herein are made in reference to "V" (FIG. 1), which is the direction of travel through the field during normal, straight-line, harvesting operations. The direction of travel is horizontal and perpendicular to the longitudinal extent of the harvesting head. The terms "transverse", "side-to-side", and the like refer to a direction generally parallel to the longitudinal extent of the harvesting head.

Figure 1:
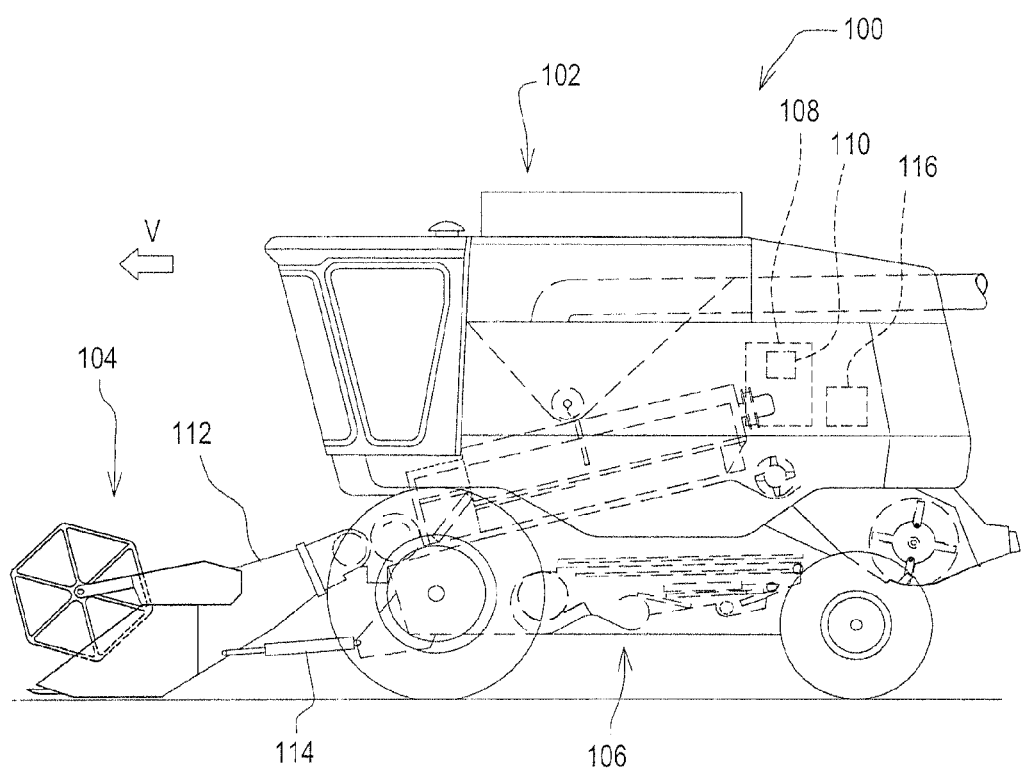
FIG. 1 is a side view of an agricultural combine.

In FIG. 1, an agricultural combine 100 comprises a combine vehicle 102 on which a harvesting head 104 is mounted. The combine vehicle has a chassis 106 supporting an engine 108 that drives a hydraulic pump 110. The harvesting head is supported on a feederhouse 112 that is pivotally coupled to the front of the combine vehicle 102. Two hydraulic cylinders 114 are coupled to and between the feederhouse and the chassis 106 of the combine vehicle 102 to support the harvesting head 104.

A hydraulic circuit 116 is coupled to and between the hydraulic pump 110 and the hydraulic cylinders 114. Hydraulic circuit 116 is configured to supply hydraulic fluid to the cylinders 114 under pressure to thereby extend them. When the hydraulic cylinders 114 extend, the feederhouse 112 pivots upward and raises the harvesting head 104 higher above the ground. Similarly, when the hydraulic circuit 116 releases hydraulic fluid from the hydraulic cylinders to return to a hydraulic reservoir 202, the hydraulic cylinders 114 retract, the feederhouse 112 pivots downward, and the harvesting head 104 lowers toward the ground.

Figure 2:
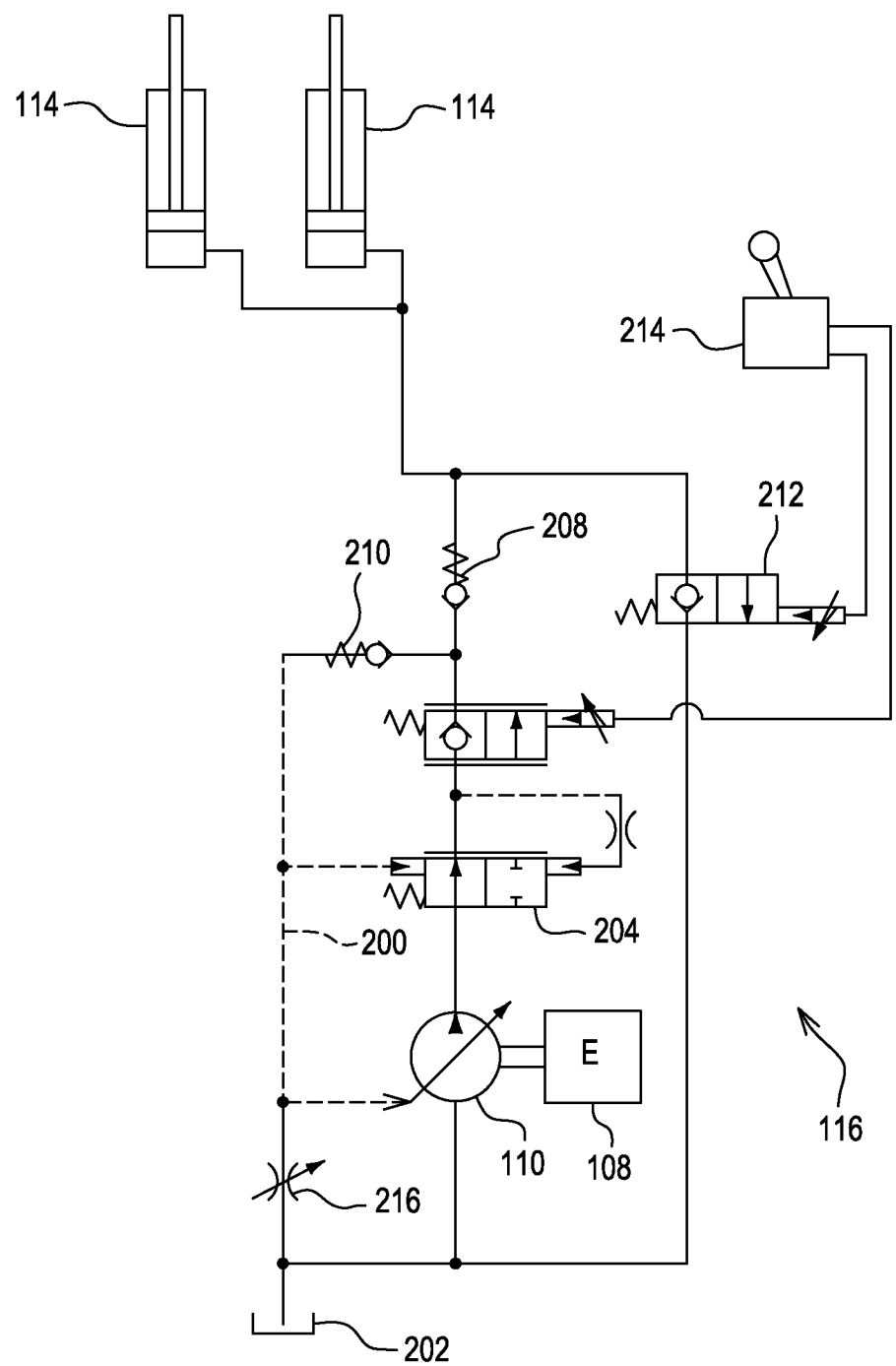
FIG. 2 is a schematic diagram of a prior art hydraulic circuit using a traditional closed center hydraulic circuit for use with the combine of FIG. 1.

FIG. 2 illustrates a typical prior art closed center hydraulic circuit to raise and lower an agricultural combine feederhouse. In this circuit, hydraulic pump 110 is driven in rotation by engine 108. Hydraulic pump 110 is a variable displacement pump, having a displacement controller coupled to a hydraulic fluid control line 200 that controls the displacement in response to the pressure applied to hydraulic fluid control line 200. The greater the pressure on hydraulic fluid control line 200, the greater the specific displacement of hydraulic pump 110, and the greater the hydraulic fluid flow from the pump.

The input of hydraulic pump 110 is in fluid communication with the reservoir 202 to receive fluid therefrom. The output of hydraulic pump 110 is in fluid communication with the input line of a pressure compensation valve 204. Pressure compensation valve 204 is biased to a normally open position, as shown, and has a first pressure controller connected to a first sense line that is coupled to hydraulic fluid control line 200 so that control line pressure acts to urge the valve 204 towards its open position, and has a second pressure controller connected to a second sense line coupled to a line extending between the pressure compensation valve 204 and the lift valve 206 so as to be coupled to the pump output when the valve 204 is in its open position, whereby pressure in the second pressure controller acts to shift the valve 204 to a closed position blocking the lift valve 206 from receiving flow from the pump 110.

A hydraulic lift valve 206 is coupled between cylinders 114 and pressure compensator 204.

A check valve 208 is disposed in the hydraulic line coupling the output connections of hydraulic lift valve 206 and cylinders 114. Check valve 208 is disposed to permit flow of fluid from the hydraulic lift valve 206 to cylinders 114 and prevent the backflow of hydraulic fluid from cylinders 114 to hydraulic lift valve 206.

A second check valve 210 couples the inlet of check valve 208 and the outlet of hydraulic lift valve 206 to hydraulic fluid control line 200. Check valve 210 is disposed to communicate hydraulic fluid from the outlet of hydraulic lift valve 206 to hydraulic fluid control line 200 and to prevent the flow of hydraulic fluid from hydraulic fluid control line 200 to the inlet of check valve 208 and the outlet of hydraulic fluid lift valve 206.

A hydraulic lower valve 212 is coupled between cylinders 114 and reservoir 202 to conduct hydraulic fluid from the cylinder 114 to the reservoir 202 when hydraulic lower valve 212 is energized. When the hydraulic lower valve 212 is not energized, it blocks the flow of hydraulic fluid from the cylinders 114 to the reservoir 202.

An operator input device 214 is coupled to the hydraulic lift valve 206 and lower valve 212 to selectively energize those valves to fill or empty cylinders 114, which responsively raises or lowers the feederhouse, which in turn raises or lowers the harvesting head.

A regulator valve 216 is coupled to and between hydraulic fluid control line 200 and reservoir 202. Regulator valve 216, here shown as an orifice, is selected to bleed down the hydraulic fluid control line 200 until its pressure is near zero whenever hydraulic lift valve 206 and hydraulic lower valve 212 are closed (i.e. when the operator is not trying to either raise or lower the harvesting head. With the pressure reduced to near zero on the hydraulic fluid control line 200, the control signal applied to pump 110 is substantially eliminated and the specific displacement of pump 110 is responsively reduced to near zero. In effect, since the pump is not needed to lift the harvesting head, it keeps rotating, but does very little work. This conserves energy and increases efficiency of the circuit as compared to an open center pump circuit which always pumps hydraulic fluid even when it is not needed, thereby generating heat and wasting energy.

The operator raises the harvesting head by manipulating operator input device 214, which responsively signals hydraulic lift valve 206 to open. When valve 206 opens, it applies the low pressure hydraulic fluid from pump 110 to check valve 210, which then transmits this low pressure fluid to hydraulic fluid control line 200. This slightly increases the pressure in hydraulic fluid control line 200. In response to this slight increase in pressure, the specific displacement of hydraulic pump 110 increases slightly. This increase in specific displacement slightly increases the output pressure of pump 110 which slight pressure increase is then communicated through hydraulic lift valve 206, through check valve 210 and back into control line 200, slightly increasing the hydraulic pressure in control line 200. This slight increase in pressure in control line 200 causes yet another slight increase in specific displacement of pump 110 and slight increase in output pressure from pump 110, thereby repeating the feedback cycle.

This pressure feedback loop through check valve 210 gradually increases the specific displacement of pump 110 until the output pressure of pump 110 finally reaches the static pressure of hydraulic fluid in cylinders 114. At which time the fluid from the pump 110 has a pressure sufficiently high to crack open check valve 208 and start filling cylinders 114.

In a typical arrangement such as this, from the time the operator initially signals the hydraulic lift valve 206 to the time cylinders 114 begin to extend can be anywhere from 130 milliseconds to 250 milliseconds. This dead time may not seem significant. However, when the operator input device 214 comprises an electronic control circuit responsive to changes in the height of harvesting head above the ground, this time delay can prevent the harvesting head from being lifted fast enough to prevent it from ramming into the ground and being damaged. This can happen when the operator input device includes an electronic control circuit that is responsive to a harvesting head height sensor and automatically raises and lowers the harvesting head to constantly maintain a preferred height above the ground, the height above the ground being selected by the operator using the operator input device.

Figure 3:
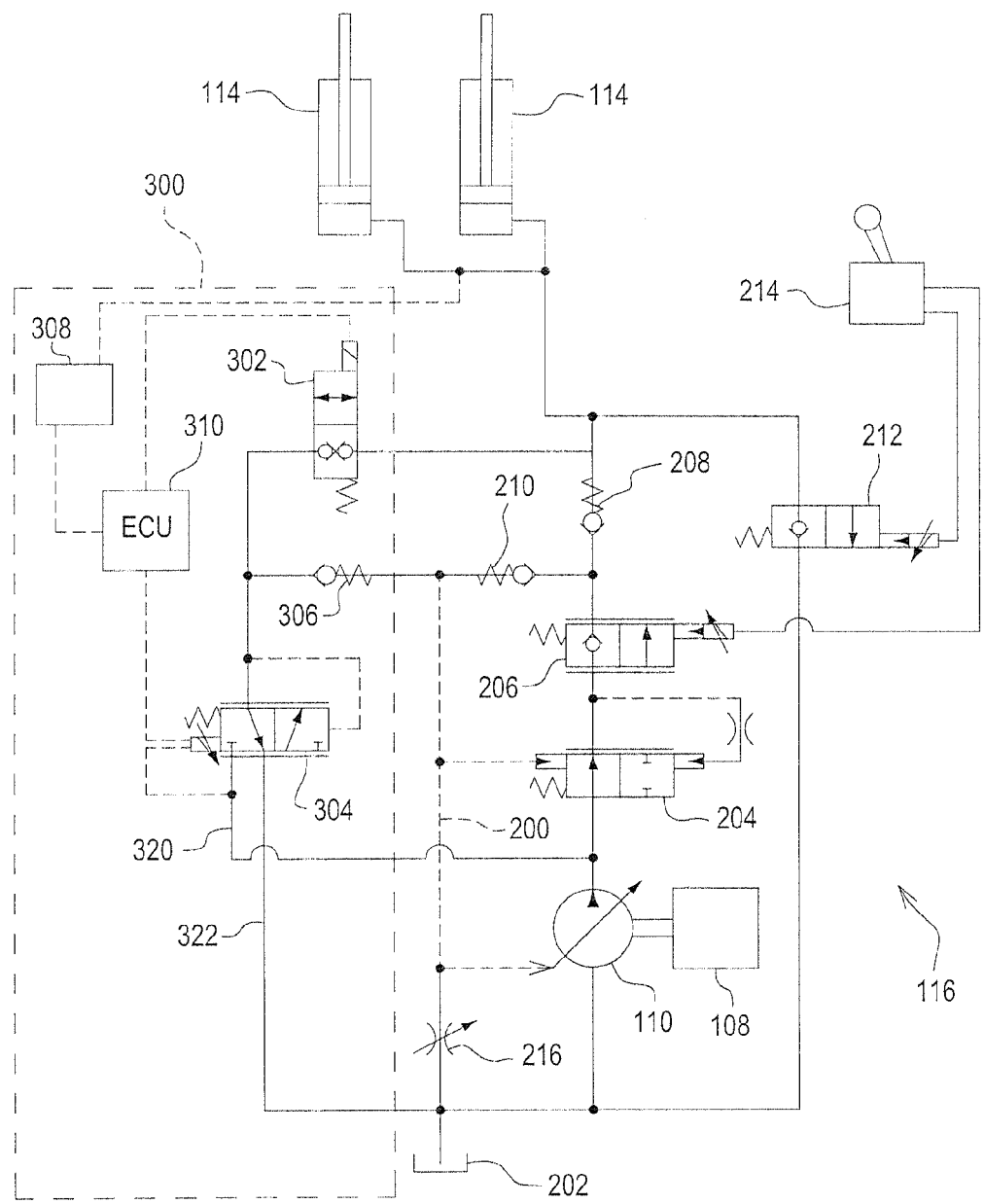
FIG. 3 is a schematic diagram of a hydraulic circuit in accordance with the present invention for use with the combine of FIG. 1.

The hydraulic circuit of FIG. 3 solves the problem of the delayed reaction time using a closed center pump circuit.

The circuit of FIG. 3 is the circuit of FIG. 2 with an additional electro-hydraulic circuit arrangement 300 that provides a float mode of operation and a faster response time for pump 110. The electro-hydraulic circuit arrangement 300 includes an on/off valve 302, a pressure control valve 304, a check valve 306, a pressure sensor 308, and an electronic control unit (ECU) 310.

ECU 310 is coupled to the on/off valve 302 to drive it to an open position from an illustrated normally closed position to which it is biased. ECU 310 is coupled to pressure control valve 304 to drive it from an illustrated normally deactivated position, wherein it couples on/off valve 302 to the reservoir 202, to an activated position corresponding to a desired pressure level, wherein the output port of the pump 110 is coupled to the control line 200 by way of the one-way check valve 306. ECU 310 is coupled to pressure sensor 308 to receive a signal indicative of the pressure in the hydraulic cylinders 114.

Pressure sensor 308 generates a signal indicative of the pressure in hydraulic cylinders 114 which it provides to ECU 310. Hydraulic cylinders cylinder 114 and check valve 208 are coupled to one side of on/off valve 302. The other side of on/off valve 302 is coupled to a first port on pressure control valve 304. Second and third ports on pressure control valve 304 are alternatively and selectively coupled to the first port of pressure control valve 304 based upon whether the command pressure indicated by the electrical pressure command signal delivered by ECU 310 is equal to, greater than or less than the actual pressure at the first port of pressure control valve 304.

Pressure control valve 304 is driven by ECU 310 such that the pressure control valve 304 applies a fluid pressure to the first port of pressure control valve 304 that is proportional to the signal applied by ECU 310. If the pressure at the first port drops below the command pressure applied by ECU 310, proportional control valve 304 applies additional pressure from pump 110 via conduit 320 until the pressure at the first port equals the command pressure. On the other hand, when the pressure at the first port of pressure control valve 304 is higher than the command pressure, pressure control valve 304 is configured to dump the excess pressure to the tank through conduit 322.

The first port of pressure control valve 304 is coupled to the inlet of check valve 306, the outlet of which is coupled to the hydraulic fluid control line 200. This arrangement applies the pressure at the first port of pressure control valve 304 to the hydraulic fluid control line 200. This pressure in turn biases the signal line of pump 110 causing it to adjust its specific displacement to maintain a pressure slightly greater than the pressure in hydraulic fluid control line 200.

In one mode of operation, called the float mode, the system is configured to maintain a constant pressure in hydraulic cylinders 114. This mode of operation is used when the harvesting head travels along the ground and a constant downforce is applied by the harvesting head to the ground. As the ground rises up or falls away underneath the harvesting head, the pressure of the harvesting head will remain constant on the ground as the ground lifts and lowers the harvesting head. This is made possible by maintaining a constant pressure in hydraulic cylinders 114. This constant pressure is maintained by energizing on/off valve 302, thereby connecting the hydraulic cylinder 114 directly to the pressure control valve.

In this float mode as the ground rises, lifting the harvesting head and extending the cylinders 114, pressure control valve 304 will supply additional hydraulic fluid to cylinders 114 from pump 110 through conduit 320 and on/off valve 302 to maintain a constant pressure in the cylinders 114 and therefor a constant pressure of the harvesting head against the ground.

Similarly in this float mode, as the ground falls, lowering the harvesting head and retracting the cylinders 114, pressure control valve 304 will withdraw excess hydraulic fluid from cylinders 114 to reservoir 202 through on/off valve 302, through pressure control valve 304 and through conduit 322 to maintain a constant pressure in the cylinders 114 and therefor a constant pressure of the harvesting head against the ground.

The dead time in this float mode of operation is reduced by connecting the pressure in the cylinders 114 through check valve 306 and thence to the signal line of pump 110. By applying the cylinder pressure to the signal line of pump 110, the output pressure of the pump is always at or near the pressure needed to apply to pressure control valve 304 and thence to cylinders 114 to lift the cylinders without the substantial time delay provided in the prior art arrangement of FIG. 2.

In a second mode of operation, called the header height control mode, the on/off valve 302 is turned off, thus blocking fluid flow through on/off valve 302. The harvesting head will not float in this mode of operation but will rise whenever the operator energizes hydraulic lift valve 206 as described in conjunction with FIG. 2, above. The harvesting head will lower whenever the operator energizes hydraulic lower valve 212 as described in conjunction with FIG. 2, above.

The difference between the mode of operation described in conjunction with FIG. 2 is the effect of the pressure control valve 304. In the arrangement of FIG. 3, the pressure control valve 304 is commanded by a signal from ECU 310 that causes the pressure control valve to generate a fluid pressure approximately equal to the pressure in cylinders 114. This is preferably done by ECU 310 periodically monitoring the actual pressure in cylinders 114 using pressure sensor 308 and then ECU 310 calculating and applying a control signal to pressure control valve 304 that will cause pressure control valve 304 to generate a signal on hydraulic fluid control line 200 that will change the displacement of pump 110 to immediately generate pressure at the output of pump substantially equal to the pressure in the cylinders 114.

In the prior art example of FIG. 2, there was no initial pressure in hydraulic fluid control line 200 before the operator opened the hydraulic lift valve 206. Since the hydraulic fluid control line 200 of FIG. 2 is only supplied with fluid for as long as fluid passes through the hydraulic lift valve 206, hydraulic fluid control line 200 bleeds down rapidly once hydraulic lift valve 206 is closed.

In contrast to this in the FIG. 3 arrangement, pressure control valve 304 supplies hydraulic fluid to hydraulic fluid control line 200 at a pressure substantially the same the pressure in cylinders 114 even when hydraulic lift valve 206 is closed.

Thus, as soon as the hydraulic lift valve 206 is opened, fluid at this elevated pressure is immediately available to cylinders 114 and there is no time delay due to the gradual ramp-up in pressure as described above in conjunction with FIG. 2.

Having described the preferred embodiment, it will become apparent that various modifications can be made without departing from the scope of the invention as defined in the accompanying claims.

The invention claimed is:

1. An agricultural combine (100) comprises a combine vehicle (102) on which a harvesting head (104) is mounted, said harvesting head (104) supported on a feederhouse (112) pivotally coupled to the front of the combine vehicle (102), said harvesting head (104) supported by a plurality of hydraulic cylinders (114) coupled to and between the feederhouse (112) and a chassis (106) of the combine vehicle (102) to support the harvesting head (104), said cylinders (114) being coupled to a hydraulic circuit (116) further comprising a closed center hydraulic pump (110), said pump (110) having a variable displacement, wherein said displacement is controllable by application of hydraulic fluid to a control line (200) of said pump (110), said pump (110) defining an input port coupled to a hydraulic reservoir (202) to receive hydraulic fluid therefrom, said pump further defining an output port, said hydraulic circuit (116) further comprising a hydraulic lift valve (206) fluidly coupled to the outlet port of said pump (110) to receive hydraulic fluid therefrom, said hydraulic lift valve (206) being further coupled to the cylinders (114) and selectively operable to supply hydraulic fluid thereto from said pump (110), wherein said hydraulic circuit (116) further comprises an electro-hydraulic control arrangement including an electronic control unit (310), a pressure sensor (308) coupled for sensing the pressure in said cylinders (114) and operable for generating an electrical pressure signal representative of the sensed pressure, with the pressure signal being connected to said electronic control unit, an electrically responsive pressure control valve (304), said electronic control unit being electrically coupled to said pressure control valve and being operable for sending an electrical pressure command signal corresponding to said electrical pressure signal to said pressure control valve, said pressure control valve (304) being coupled to said control line (200) of said pump (110) to signal said pump (110) to generate a pressure substantially equal to the hydraulic pressure in the cylinders (114) at least when the hydraulic lift valve (206) is closed, and said pressure control valve (304) being coupled to the output port of the pump (110) and to the reservoir (202) and, for establishing a cylinder float mode, being selectively coupleable to said cylinders (114) for maintaining a commanded hydraulic pressure in said cylinders (114) over a range of cylinder positions.

2. The agricultural combine of claim 1, wherein said hydraulic circuit (116) further comprises a flow control valve (302) located between an outlet port of said pressure control valve (304) and said cylinders (114) and being selectively operable to connect the outlet port of the pressure control valve to the cylinders in said a cylinder flotation mode.

3. The agricultural combine of claim 1, wherein said hydraulic circuit (116) further comprises a regulator valve (216), wherein said regulator valve (216) is disposed between said pressure control valve (304) and said reservoir (202) to continually bleed down said control line (200).

4. An agricultural combine comprises a combine vehicle (102), and a feederhouse (112) pivotally coupled to the front of the combine vehicle (102), wherein said feederhouse (112) is configured to support a harvesting head (104), wherein said feederhouse (112) is supported by a plurality of hydraulic cylinders (114) coupled to and between the feederhouse (112) and a chassis (106) of the combine vehicle (102), wherein said cylinders (114) are coupled to a hydraulic circuit (116) further comprising a closed center hydraulic pump (110), said pump (110) having a variable displacement, wherein said displacement is controllable by application of hydraulic fluid to a control line (200) of said pump (110), said pump (110) defining an input port coupled to a hydraulic reservoir (202) to receive hydraulic fluid therefrom, said pump further defining an output port, said hydraulic circuit (116) further comprising a hydraulic lift valve (206) fluidly coupled to the outlet port of said pump (110) to receive hydraulic fluid therefrom, said hydraulic lift valve (206) being further coupled to the cylinders (114) to supply hydraulic fluid thereto from said pump (110), with said lift valve (206) being selectively operable between a normally closed position blocking flow to the cylinders from the pump, and an open position permitting flow from the pump to the cylinders, wherein said hydraulic circuit (116) further comprises a pressure control valve (304) having a first port coupled to said control line (200) of said pump (110) by way of a check valve (306) permitting flow only in the direction of the control line (200), the output port of the pump being coupled to a second port of said control valve (304), with said pressure control valve (304) being selectively operable in response to a command signal corresponding to the pressure in said cylinders (114) to couple said second port to said first port to signal said pump (110) to generate a pressure substantially equal to the hydraulic pressure in the cylinders (114) at least when the hydraulic lift valve (206) is closed, wherein said pressure control valve (304) is selectively coupleable to said cylinders (114) for maintaining a commanded hydraulic pressure in said cylinders (114) over a range of cylinder positions.

5. The agricultural combine (100) of claim 4, further comprising said pressure control valve (304) being electrically responsive, an electronic control unit (310) coupled for receiving an electrical pressure signal representing the pressure in said cylinders (114) and coupled for delivering an electrical pressure command signal to the pressure control valve (304) to signal the valve (304) to apply the commanded pressure to said cylinders (114).

6. The agricultural combine (100) of claim 5, further comprising a pressure sensor (308) responsive to a pressure in the cylinders (114), wherein said pressure sensor (308) generates an electrical pressure signal which is coupled to the electronic control unit (310) to provide said pressure signal to said electronic control unit (310), wherein said signal corresponds to said pressure in said cylinders (114).

7. The agricultural combine of claim 4, wherein said on/off valve (302) is located between said pressure control valve (304) and said cylinders (114) and is selectively operable to an on position wherein it couples the second port of said valve means (304) to a port of said cylinders (114) in a cylinder flotation mode of operation.

8. A hydraulic circuit (116) for controlling the height of a harvesting head (104) and feederhouse (112) mounted on a combine vehicle (102) and supported by a plurality of hydraulic cylinders (114) coupled to and between the feederhouse (112) and a chassis (106) of the combine vehicle (102) wherein said hydraulic cylinders (114) are disposed to raise the harvesting head (104) and feederhouse (112) when extended and to lower the harvesting head (104) and feederhouse (112) when retracted, said hydraulic circuit (116) comprising a closed center hydraulic pump (110), said pump (110) having a variable displacement, wherein said displacement is controllable by application of hydraulic fluid to a control line (200) of said pump (110), said pump (110) defining an input port coupled to a hydraulic reservoir (202) to receive hydraulic fluid therefrom, said pump further defining an output port, said hydraulic circuit (116) further comprising a hydraulic lift valve (206) fluidly coupled to the outlet port of said pump (110) to receive hydraulic fluid therefrom, said hydraulic lift valve (206) being further coupled to the cylinders (114) to supply hydraulic fluid thereto from said pump (110), wherein said hydraulic circuit (116) further comprises a pressure control valve (304) having an inlet port coupled to said outlet port of said pump, a return port coupled to said hydraulic reservoir (202) and an outlet port coupled to said control line (200) of said pump (110), said pressure control valve (304) being shiftable between a normally deactivated position, wherein the outlet port is coupled to the return port, and an activated position, wherein the inlet port is coupled to the outlet port, with said control valve (304) being shiftable to said activated position in response to a control signal representing a hydraulic pressure in said cylinders (114) and wherein the control valve (304) acts to signal said pump (110) to generate a pressure substantially equal to the hydraulic pressure in the cylinders (114) at least when the hydraulic lift valve (206) is closed, wherein a normally closed control valve (302) is coupled to said outlet port of the pressure control valve (304) and to said cylinders (114) and is selectively operable from said normally closed position to an open position coupling said pressure control valve (304) to said cylinders (114) for maintaining a commanded hydraulic pressure in said cylinders (114) over a range of cylinder positions.

* * * * *